US006404859B1

(12) United States Patent
Hasan

(10) Patent No.: US 6,404,859 B1
(45) Date of Patent: Jun. 11, 2002

(54) VOICE ENABLED SYSTEM FOR REMOTE ACCESS OF INFORMATION

(75) Inventor: Moh'd Abdel-Hamid Hasan, Yardley, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/306,034

(22) Filed: May 6, 1999

Related U.S. Application Data

(63) Continuation-in-part of application No. 09/270,926, filed on Mar. 16, 1999.

(51) Int. Cl.$^7$ .............................................. H04M 1/652
(52) U.S. Cl. ................................ 379/88.04; 379/88.14; 704/270
(58) Field of Search ........................... 379/88.01, 88.02, 379/88.04, 88.14, 88.16, 88.22, 93.01, 93.02, 93.03; 704/270, 271, 272, 273, 275, 277; 709/225; 455/412, 413, 414; 713/182, 184, 201; 707/1, 9, 10

(56) References Cited

U.S. PATENT DOCUMENTS

| 4,979,206 A | * | 12/1990 | Padden et al. | |
| 5,297,183 A | * | 3/1994 | Bareis et al. | |
| 5,471,521 A | * | 11/1995 | Minikami et al. | |
| 5,479,488 A | * | 12/1995 | Lennig et al. | |
| 5,717,743 A | * | 2/1998 | McMahan et al. | |
| 5,805,674 A | * | 9/1998 | Anderson, Jr. | 379/93.03 |
| 5,884,262 A | * | 3/1999 | Wise et al. | 704/270 |
| 5,884,312 A | * | 3/1999 | Dustan et al. | 707/10 |
| 6,212,633 B1 | * | 4/2000 | Levy et al. | 713/153 |
| 6,138,100 A | * | 10/2000 | Dutton et al. | 704/275 |
| 6,154,465 A | * | 11/2000 | Pickett | 370/466 |
| 6,233,318 B1 | * | 5/2001 | Picard et al. | 379/88.17 |
| 6,256,737 B1 | * | 7/2001 | Bianco et al. | 713/186 |
| 6,317,837 B1 | * | 11/2001 | Kenworthy | 713/200 |
| 6,321,337 B1 | * | 11/2001 | Reshef et al. | 713/201 |

* cited by examiner

Primary Examiner—Scott L. Weaver
(74) Attorney, Agent, or Firm—Duane Morris LLP

(57) ABSTRACT

An arrangement for remotely retrieving information from a computer memory over an audio channel includes an audio channel such as a telephone line. A user speaks a command into the audio channel, and it is received at the other end, which is within a private network. Within the private network, the user is authenticated, as by evaluation of a code number or by voice signature. Once authenticated, the user's spoken command is applied to a speech recognition arrangement, also within the private network, which converts the spoken command into a computer-executable command. The executable command is applied to the appropriate network memory, and the computer file is retrieved. The retrieved file is applied to a firewall in order to block transmission of any information from the private network which is deemed to be inappropriate for transmission over the audio channel, or which should not leave the private network in computer-readable form. If not blocked, the file is applied to a text-to-speech converter within the-private network, and converted into speech. The speech signals representing the retrieved information are applied to the second end of the audio channel, and transmitted to the user. Thus, computer-readable files do not leave the private network. In a particularly advantageous embodiment, the information is e-mail.

10 Claims, 3 Drawing Sheets

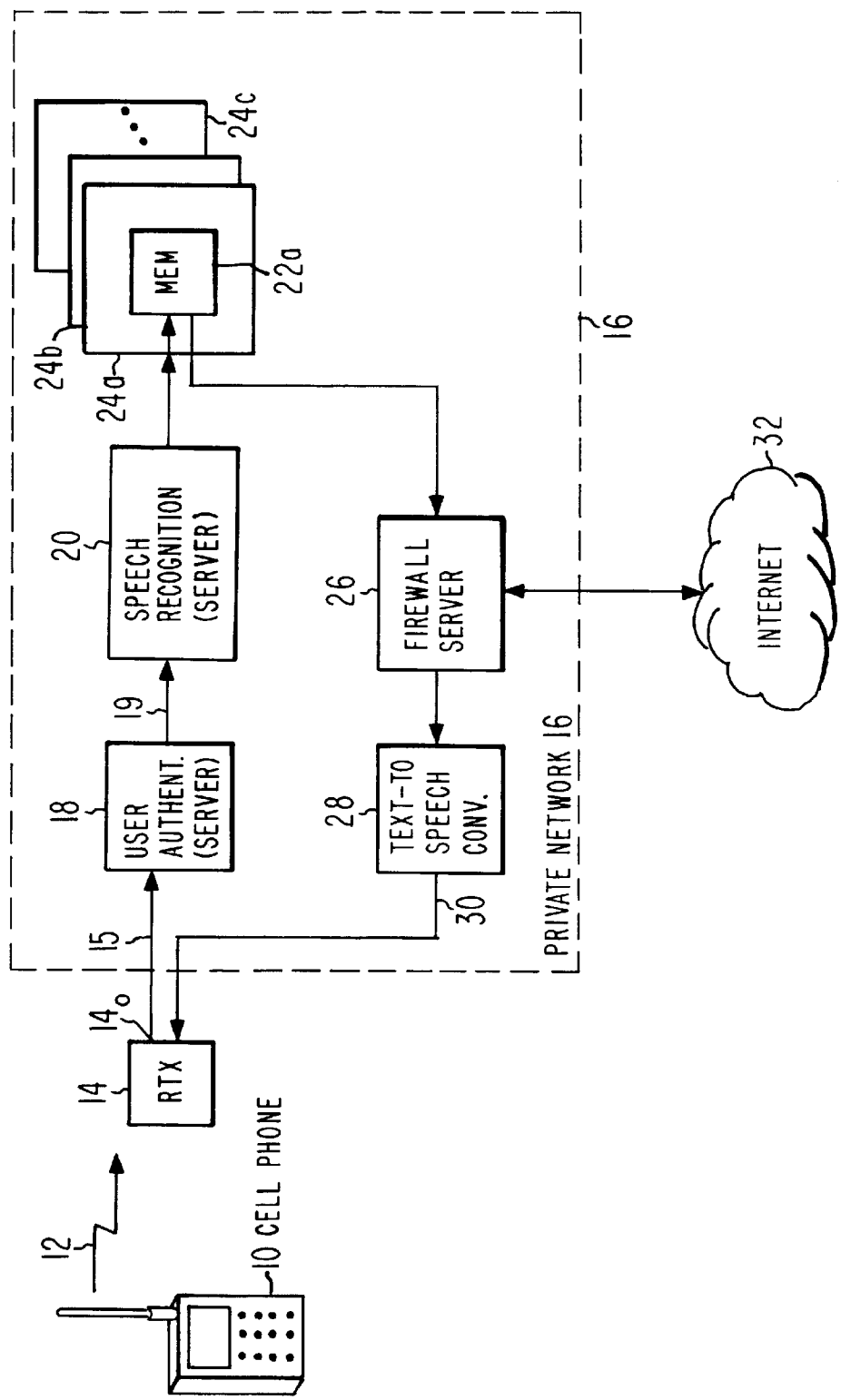

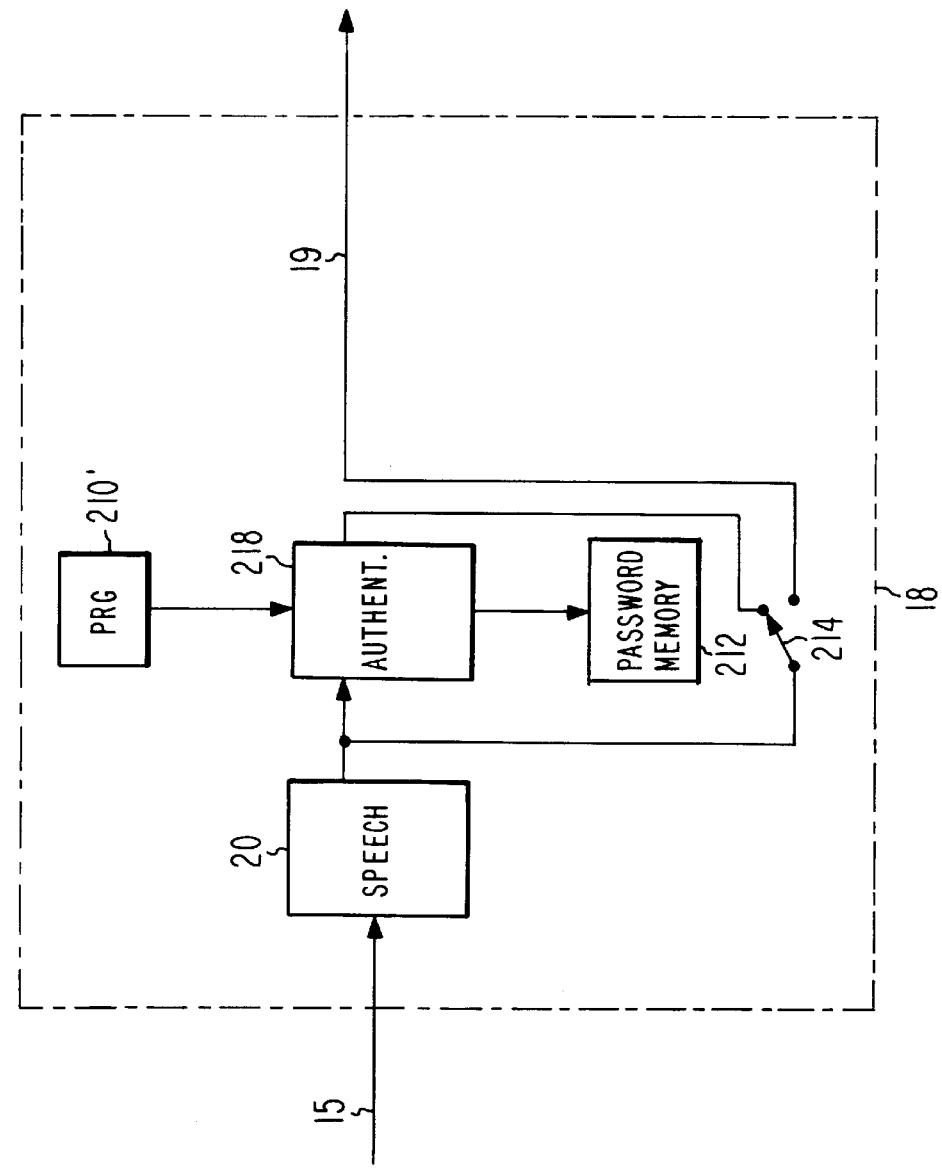
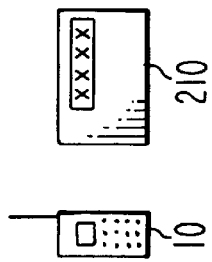

VOICE ENABLED SYSTEM FOR REMOTE ACCESS OF INFORMATION

This application is a continuation-in-part of Ser. No. 09/270,926, filed Mar. 16, 1999.

FIELD OF THE INVENTION

This invention relates to arrangements for accessing the contents of computer files from locations remote from where the files are stored, and more particularly to retrieval of information over an audio channel.

BACKGROUND OF THE INVENTION

Communications are becoming increasingly important to modern business, entertainment, and military users. In many contexts, the communications involve the accessing of the information in files which are stored on computer memories or databases which are at locations remote from the person desiring to access the information.

A remote access service is currently provided by General Magic, Inc. of Sunnyvale, Calif. This remote access service allows a user to call into a server located in Sunnyvale, and, using voice commands, to cause the Sunnyvale server to communicate with another server, remote from Sunnyvale, at which the user's information, such as e-mail, or other information which he may be authorized to receive, is stored. This other server may be a server associated with a business or enterprise. In order to prevent unauthorized persons from accessing information on the second server, such as e-mail of another, the authorized user of the service must enter an appropriate user identification. A company known as wirelessknowledge has proposed a modification to the system of General Magic, in which a third server, located in San Diego, is cascaded with the Sunnyvale server, to allow the San Diego server to provide the voice-command capability to additional users.

Improved remote access systems and methods are desired.

SUMMARY OF THE INVENTION

A method for accessing information stored on a remote computer includes the step of uttering a command into a first end of an audio channel which includes a publicly accessible portion, so that an electronic equivalent of the speech appears at a second end of the audio channel, remote from the first end. The electronic equivalent of the speech is coupled from the second end of the audio channel to a private network which is not accessible to the public. Within the private network, the spoken command is converted into an executable or digital-form command, and, in response to the executable command, information identified by the command is retrieved from computer memory, to thereby generate retrieved information. The retrieved information is applied to a firewall evaluation arrangement within the private network, for determining if the retrieved information is of a type which may be allowed to be transmitted over the audio channel. If the retrieved information is of a type which may not be allowed to be transmitted over the audio channel, the retrieved information is blocked by the firewall evaluation arrangement to prevent its leaving the private network, and if the retrieved information is of a type which may be allowed to be transmitted over the audio channel, the retrieved information is converted, within the private network, into speech representing the retrieved data. The speech representing the retrieved data is applied to the second end of the audio channel, for transmission to the first end of the audio channel.

In a particular mode of the method, a further step is performed, between the steps of coupling the electronic equivalent of the speech and converting the speech into an executable command. This additional step includes, within the private network, authenticating the source of the speech signal, to thereby provide access to the private network. This authentication may be performed in as simple a manner as comparison of a keyed-in PIN with a stored value, or it may involve recognition of the user by evaluation of the characteristics of his voice, or alternatively the user may read a pseudorandom number generated by a generator which the user carries with him, which is compared with the number stored on an identical pseudorandom number generator within the private network. The retrieved information may be e-mail.

An apparatus according to an aspect of the invention, for remotely accessing, by way of an audio channel, information stored in a computer memory within a private network, includes a memory within the private network, on which information to be remotely accessed is stored in files. An audio communication channel includes a first end available to any user and a second end to which user voice commands can be sent over the channel. A speech recognition engine within the private network, when commanded by a voice, converts voice commands identifying a designated file into an executable command to find the designated file. A file search arrangement within the private network, in response to the executable command, controllably accesses the designated file in the memory. An information content authenticating arrangement within the private network is coupled to the memory, for evaluating the information of the designated file, and for passing (or approving the passage of) the designated file only when the designated file contains unrestricted information. A text-to-speech engine within the private network is coupled to the information content authenticating arrangement and to the second end of the audio communication channel, for converting the contents of the designated file into speech, and for transmitting the speech by way of the audio communication channel to the user.

A particular embodiment of the apparatus includes a user authentication arrangement within the private network. The authenticating arrangement is coupled to the second end of the audio communication channel and to the speech recognition engine, for generating a path by which the user voice command can reach the speech recognition engine only when the user is authenticated.

One version of the user authentication arrangement includes a clocked pseudorandom generator for generating a time-variant code number, and a comparator coupled to the pseudorandom generator, and also coupled to the second end of the audio channel, for comparing an identification number transmitted from the user to the comparator over the audio channel with the time-variant code number; this version also includes a second clocked pseudorandom generator available to the user. The second pseudorandom generator is sufficiently similar to the first pseudorandom generator to produce the same time-variant code number as the first pseudorandom generator, as a result of which, or whereby, the comparator authenticates the user by comparing the time-variant code number from the first and second pseudorandom generators.

Another version of the authentication arrangement includes a voice authenticator, which processes the voice of the user to establish the authenticity of the user.

Yet another user authentication arrangement comprises a PIN authenticating arrangement coupled to a speech passing gate, for passing speech when the PIN is authenticated.

BRIEF DESCRIPTION OF THE DRAWING

FIG. 1 is a simplified block diagram of a system according to an aspect of the invention;

FIG. 2a is a simplified block diagram of a user portion of a user authentication system according to an aspect of the invention, which may be used in conjunction with the arrangement of FIG. 1, and FIG. 2b is a simplified block diagram of a remote portion of the authentication system.

DESCRIPTION OF THE INVENTION

Figure 3:
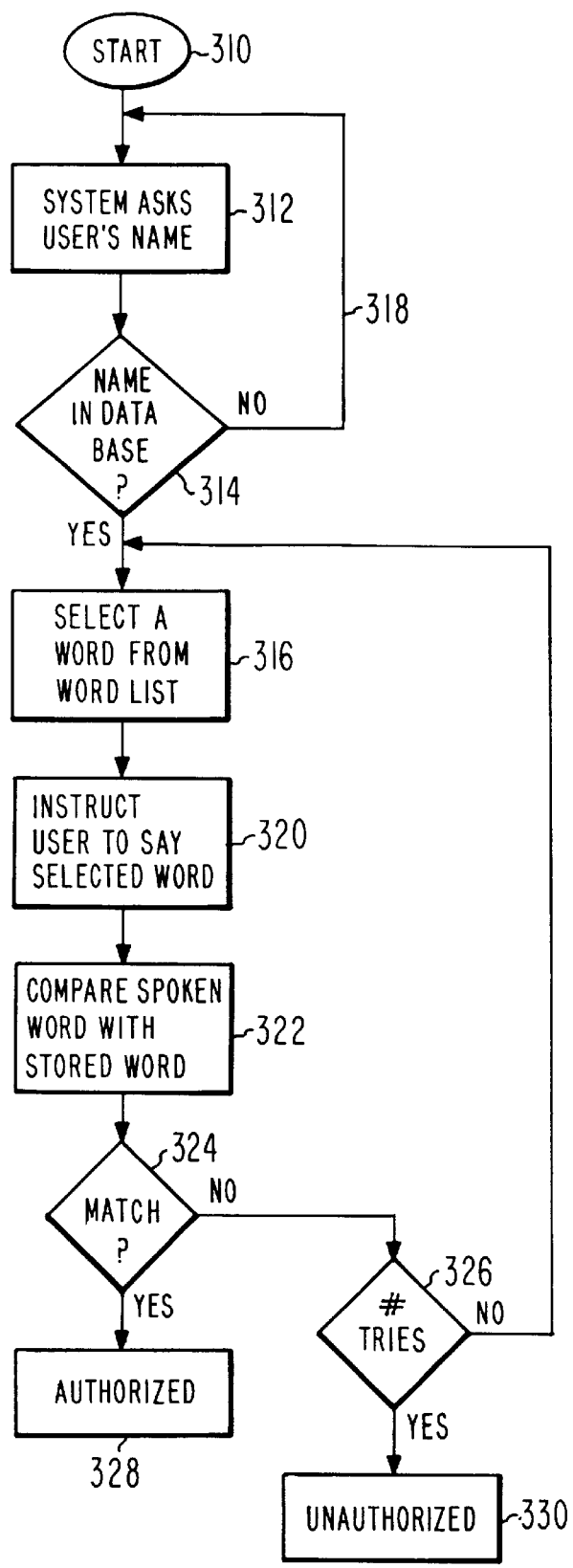
FIG. 3 is a simplified flow chart or diagram illustrating the operation of another embodiment of a user authentication arrangement which may be used in conjunction with the arrangement of FIG. 1.

The abovedescribed General Magic communication system has the disadvantage that the information which the user desires to remotely access may be proprietary, being obtained from a private source, which "owns" the data. Consequently, the private source, namely the business or company which holds the data, must agree to allow the data to reside, at least temporarily, at the server at General Magic's Sunnyvale location. In the case of wirelessknowledge's modification, the data must reside in at least two servers, under the control of disparate entities. Thus, a text version (digital version) of the private information must reside in at least one server which lies outside the control of an enterprise or business which "owns" the information. The enterprise may not desire such proprietary information to be stored in a computer or server which is not under its own control.

In FIG. 1, a cellular telephone 10 communicates by way of an electromagnetic signal path 12 with a cellular transceiver (RTX) 14 located at a site 16 remote from the cellular telephone 10. The voice of the user of the remote cellular telephone 10 becomes available on signal path 15 at the output port 14o of transceiver 14. Thus, the speech signal appears on a signal path 15 located within a private network or system 16. Any other method for transmitting the voice of the user to signal path 15, such as a land-line public switched telephone network (PSTN), or a satellite communication system, will suffice for purposes of the invention. Thus, signal path 15 is not wholly within the control of an enterprise or business which controls private network 16. However, the enterprise or business may wish to make some of its information available to authorized users.

The user's voice signals appearing on signal path 15 are applied to an authentication portion of the system, illustrated as a block 18. Block 18 authenticates the user in response to voice signature or some appropriate keyed-in password. Upon authentication, the voice signal is made available to a speech-recognition block 20, together with a code identifying the user. Speech recognition block 20 converts speech into computer-recognizable commands. Block 20 may convert a voice command such as "Do I have any e-mail?" into a command to perform a corresponding search of the appropriate memory, such as memory 22 of computer 24, to determine the existence of files meeting the criterion for the specified user. Such speech recognition systems exist, and should be known to those skilled in the art. The executable command is sent from speech recognition block 20 to the memory, illustrated as 22a, of an appropriate one of a plurality of computers 24a, 24b, . . . , 24c within the private network 16.

In response to the command to determine the existence of e-mail for the user, the computer 24a generates a digital message representing the number of e-mail messages stored in memory 22a for the particular user. The digital message representing the number of e-mail messages flows from computer 24 to a firewall server illustrated as a block 26, also within the private network 16. Firewall 26 is programmed to allow certain information to pass from computer 24a (and other like computers) to the outside world, including the internet, illustrated as a cloud 32, and to prevent the flow of certain information, to and from the internet. In addition, firewall 26 is programmed to make the same distinction with regard to messages from computer 24a (and other such computers) directed to text-to-speech converter 28. The techniques for identifying the categories of information which can be passed or blocked by firewall 26 are well known, and form no part of the invention.

The information relating to the number of e-mail files is presumably not the kind of information which is to be maintained within the private network 16 of FIG. 1, so the firewall 26 allows the message to proceed to its destination, which is the text-to-speech converter 28, which lies within private network 16. Text-to-speech converter 28 converts the digital message into electronic signals representing synthesized or recorded human voice. The electronic signals representing voice are supplied by way of a path 30 to transceiver 14, for transmission of the signals to cellular phone 10. The user of the cellular phone then hears the message "You have ten new e-mail messages." In response, the user may command "Read e-mail messages." or words of similar import. The command to read the e-mail messages is transmitted over air path 12 to transceiver 14, and the received signals are coupled (by intermediate paths, not illustrated) over path 15, and through already-satisfied authenticator 18 to speech recognition block 20. Speech recognition block 20 processes the command "Read e-mail messages." and produces suitable executable commands. The executable commands are coupled to the appropriate one of the computers, such as computer 24a. In response to the commands, the first e-mail message is accessed from memory 22a, and flows to firewall 26. Assuming that the content of the first e-mail message includes only information which the firewall 26 will permit to pass to the outside world, the first e-mail message flows to text-to-speech converter 28, and on to the user in the same manner as described above. In the event that one or more of the succeeding e-mail messages contains information which the firewall 26 is programmed to protect, the firewall prevents that (or those) e-mail messages from proceeding further. For those instances in which the message is prevented from proceeding, the firewall may produce, or cause to be produced, an appropriate "regrets" message, which is applied to text-to-speech converter 28. Thus, when e-mail is accessed, the user of the cellular phone 10 of FIG. 1 receives a speech version of the e-mail, or if the firewall intervenes to prevent the e-mail message from being transmitted, the user receives a speech message indicating that the e-mail message may not be remotely retrieved.

The authentication performed in block 18 of FIG. 1 may be accomplished by use of an arrangement such as that illustrated in FIGS. 2a and 2b. In FIG. 2a, the user of cellular phone 10 also has access to a pseudorandom number generator (PRG) 210, which produces a display of a time-varying alphanumeric, such as a time-varying number. FIG. 2b illustrates block 18 of FIG. 1 as modified to allow speech recognition block 20 to receive speech directly (or by intermediary paths) from transceiver 14 by way of path 16. The user of the cellular phone 10 of FIG. 2a reads into the phone the number currently displayed on the display of PRG 210, followed (or preceded) by his personal identification code (PIN). Speech recognition block 20 of FIG. 2b receives the speech, and converts the speech into digital signals for further processing. The digitized signals are coupled to an authenticating block 218, which compares the digital version of the alphanumerics with a pseudorandom code generated by a PRG 210', which is "identical" to PRG 210 of FIG. 2a in that it produces the same code, and is time-synchronized therewith. Thus, the spoken PR code and the code produced by generator 210' should be the same. Authenticator 218 of FIG. 2a also compares the user's PIN with the corresponding PIN stored in a memory 212, to establish the user's identity. Upon accepting the user as valid, authenticator 218 can pass the speech on to signal path 19, as for example by throwing a switch 214 to its "closed" state. The switch 214 can be reset to the open state in the event of a period of time without activity, in response to a dial tone, and or in response to a statement of ending by the user, such as "goodbye."

FIG. 3 is a simplified flow chart which illustrates a voice authenticating arrangement in accordance with an aspect of the invention. In FIG. 3, the logic starts at a START block 310, and proceeds to a block 312, which represents the system instructing the user to state his name. After waiting for a response, the logic flows to a decision block 314, which compares the name with the names available in a memory of potentially authorized users. If the name is found, the logic leaves decision block 314 by the YES output, and proceeds to a block 316. If not, the logic proceeds back to block 312 by way of a path 318. In practice, the number of iterations around the loop including path 318 may be limited to prevent an unauthorized user from having an excessive number of tries to find an authorized user name. Logic block 316 represents the selection of a random word from a list of recorded or stored words, which are known to have been spoken by the true user attempting to gain access. Block 320 represents a request to the user to say the selected word. From block 320, the logic flows to a block 322, which represents a comparison of characteristics of the spoken word with the stored word. From block 322, the logic flows to a decision block 324, which represents an evaluation of the comparison of the spoken word with the previously stored word. If the correlation is insufficient, a "no match" is declared, and the logic flows to a decision block 326 back, which evaluates the number of words which have been tried. If the number of words does not exceed the selected maximum number, the logic leaves decision block 326 by the YES output, and returns to block 316, for selection of another word to be spoken. If a match is found by decision block 324, the logic leaves by the YES output, and proceeds to a block 328, which represents the declaration of an authorized user, and the coupling of the voice from signal path 15 to speech recognition block 20 of FIG. 1. If a match is not found after a selected number of tries, the logic leaves decision block 326 by the NO output, and proceeds to a block 330, which represents declaration of no authorization, and the advising of the putative user that access is denied.

The described system allows the enterprise, business, or operator of a private network to provide remote voice access to authorized users without the need to allow the temporary or permanent storage of information files on a server which is not under the control of that enterprise. When information leaves the private network, it is in the form of speech rather than computer-readable digital data or information.

Other embodiments of the invention will be apparent to those skilled in the art. For example, digital devices may operate using either serial or parallel data paths. While authentication has been described as requiring the user to speak both a PIN and the current value of a PR number from a security card, sufficient security may be deemed to be provided by use of only one of these measures alone. The term "within a private network" does not require that all portions of the network be co-located, within the same building, site, or even country; rather, it refers to the issue of control. Thus, the private network may include leased telephone or data lines, or paths, or a leased channel among a plurality of channels propagating over a single system, since there is no storage on such leased paths or channels, and only the enterprise has access to stored computer-readable matter.

Thus, a method for accessing information stored on a remote computer (24a) according to an aspect of the invention includes the step of uttering a command into a first end (10) of an audio channel (10, 12, 14, 15) which includes a publicly accessible portion, so that an electronic equivalent of the speech appears at a second end (15$_2$) of the audio channel (10, 12, 14, part of 15), remote from the first end (10). The electronic equivalent of the speech is coupled (by a portion of path 15) from the second end (15$_2$) of the audio channel (10, 12, 14, 15) to a private network (16) which is not accessible to the public. Within the private network (16), the spoken command is converted (20) into an executable or digital-form command, and, in response to the executable command, information identified by the command is retrieved from computer (24a) memory (22a), to thereby generate retrieved information. The retrieved information is applied to a firewall evaluation arrangement (26) within the private network (16), for determining if the retrieved information is of a type which may be allowed to be transmitted over the audio channel (10, 12, 14, 15). If the retrieved information is of a type which may not be allowed to be transmitted over the audio channel (10, 12, 14, 15), the retrieved information is blocked by the firewall evaluation arrangement (26) to prevent its leaving the private network (16), and if the retrieved information is of a type which may be allowed to be transmitted over the audio channel (10, 12, 14, 15), the retrieved information is converted (28), within the private network (16), into speech representing the retrieved data. The speech representing the retrieved data is applied to the second end (15$_2$) of the audio channel (10, 12, 14, 15), for transmission to the first end (10) of the audio channel (10, 12, 14, 15).

In a particular mode of the method, a further step (18) is performed, between the steps of coupling (by a portion of path 15) the electronic equivalent of the speech and converting (20) the speech into an executable command. This additional step (18) includes, within the private network (16), authenticating (18) the source of the speech signal, to thereby provide access to the private network (16). This authentication may be performed in as simple a manner as comparison of a keyed-in PIN with a stored (212) value, or it may involve recognition of the user by evaluation of the characteristics of his voice, or alternatively the user may read a pseudorandom number generated by a generator (210) which the user carries with him, which is compared (218) with the number stored on an identical pseudorandom number generator (210') within the private network (16). The retrieved information may be e-mail.

An apparatus according to an aspect of the invention, for remotely accessing, by way of an audio channel (10, 12, 14, 15), information stored in a computer (24a) memory (22a) within a private network (16), includes a memory (22a) within the private network (16), on which information to be remotely accessed is stored in files. An audio communication channel (10, 12, 14, part of 15) includes a first end (10) available to any user and a second end (15$_2$) to which user voice commands can be sent over the channel. A speech recognition engine (20) within the private network (16), when commanded by a voice, converts voice commands identifying a designated file into an executable command to find the designated file. A file search arrangement (computer 24a) within the private network (16), in response to the executable command, controllably accesses the designated file in the memory (22a). An information content authenticating arrangement (firewall 26) within the private network (16) is coupled to the memory (22a), for evaluating the information of the designated file, and for passing (or approving the passage of) the designated file only when the designated file contains unrestricted information. A text-to-speech engine (28) within the private network (16) is coupled to the information content authenticating arrangement (26) and to the second end (15$_2$) of the audio communication channel, for converting the contents of the designated file into speech, and for transmitting the speech by way of the audio communication channel to the user. In a particularly advantageous embodiment, the audio communication channel includes an "air" or electromagnetic propagation path (12), such as the path associated with a cellular or satellite telephone handset.

A particular embodiment of the apparatus includes a user authentication arrangement (18) within the private network (16). The authenticating arrangement (18) is coupled to the second end (15$_2$) of the audio communication channel and to the speech recognition engine (20), for generating a path by which the user voice command can reach the speech recognition engine only when the user is authenticated.

One version of the user authentication arrangement includes a clocked pseudorandom generator (210') for generating a time-variant code number, and a comparator (218) coupled to the pseudorandom generator (210'), and also coupled (by way of speech recognition block 20) to the second end (15$_2$) of the audio channel (10, 12, 14, 15), for comparing an identification number transmitted from the user to the comparator over the audio channel (10, 12, 14, 15) with the time-variant code number; this version also includes a second clocked pseudorandom generator (210) available to the user. The second pseudorandom generator (210) is sufficiently similar to the first pseudorandom generator (210') to produce the same time-variant code number as the first pseudorandom generator (210), as a result of which, or whereby, the comparator (218) authenticates the user by comparing the time-variant code number from the first (210') and second (210) pseudorandom generators.

Another version of the authentication arrangement (18) includes a voice authenticator, which processes the voice of the user to establish the authenticity of the user.

Yet another user authentication arrangement comprises a PIN authenticating arrangement coupled to a speech passing gate, for passing speech when the PIN is authenticated.

What is claimed is:

1. A method for accessing information stored on a remote computer, said method comprising the steps of:
   uttering a command into a first end of an audio channel which includes a publicly accessible portion, so that an electronic equivalent of said speech appears at a second end of said audio channel, remote from said first end;
   coupling said electronic equivalent of said speech from said second end of said audio channel to a private network which is not accessible to the public;
   within said private network, converting said spoken command into an executable command;
   within said private network, in response to said executable command, retrieving information identified by said command from computer memory, to thereby generate retrieved information;
   applying said retrieved information to a firewall evaluation arrangement within said private network, for determining if said retrieved information is of a type which may be allowed to be transmitted over said audio channel;
   if said retrieved information is of a type which may not be allowed to be transmitted over said audio channel, blocking said retrieved information to prevent its leaving said private network, and if said retrieved information is of a type which may be allowed to be transmitted over said audio channel, within said private network, converting said retrieved information into speech representing said retrieved data;
   applying said speech representing said retrieved data to said second end of said audio channel, for transmission to said first end of said audio channel.

2. A method according to claim 1, further comprising the step, between said steps of coupling said electronic equivalent of said speech and converting said speech into an executable command, of:
   within said private network, authenticating the source of said speech signal, to thereby provide access to said private network.

3. A method according to claim 1, wherein said retrieved information is e-mail.

4. A method according to claim 1, wherein said uttering step includes the step of uttering said command into a first end of an audio channel which includes an air path.

5. An apparatus for remotely accessing, by way of an audio channel, information stored in a computer memory within a private network, said apparatus comprising:
   a memory within said private network, on which information to be remotely accessed is stored in files:
   an audio communication channel including a first end available to any user and a second end to which user voice commands can be sent;
   a speech recognition engine within said private network which, when commanded by a voice, converts voice commands identifying a designated file into an executable command to find said designated file;
   file search means within said private network for, in response to said executable command, controllably accessing said designated file in said memory;
   information content authenticating means within said private network, said authenticating means being coupled to said memory, for evaluating the information of said designated file, and for passing said designated file only when said designated file contains unrestricted information;
   a text-to-speech engine within said private network, said engine being coupled to said information content authenticating means and to said second end of said audio communication channel, for converting the contents of said designated file into speech, and for transmitting said speech to said user.

6. An apparatus according to claim 5, further comprising user authentication means within said private network, said authenticating means being coupled to said second end of said audio communication channel and to said speech recognition engine, for generating a path by which said user voice command can reach said speech recognition engine only when said user is authenticated.

7. An apparatus according to claim 6, wherein said user authentication means comprises:

a clocked pseudorandom generator for generating a time-variant code number;

comparison means coupled to said pseudorandom generator, and also coupled to said second end of said audio channel, for comparing an identification number transmitted from said user to said comparison means over said audio channel with said time-variant code number; and a second clocked pseudorandom generator available to said user, said second pseudorandom generator being sufficiently similar to said first pseudorandom generator to produce said time-variant code number, whereby said comparison means authenticates said user by comparing said time-variant code number from said first and second pseudorandom generators.

8. An apparatus according to claim 6, wherein said user authentication means comprises a voice authenticator, which processes the voice of said user to establish said authenticity of said user.

9. An apparatus according to claim 6, wherein said user authentication means comprises a PIN authenticating means coupled to a speech passing gate, for passing speech when said PIN is authenticated.

10. An apparatus according to claim 5, wherein said audio communication channel includes an air path.

* * * * *